Feb. 21, 1933.  H. E. ENDERS  1,898,819
ATTACHMENT FOR CALCULATING MACHINES
Original Filed Aug. 17, 1927   9 Sheets-Sheet 1

INVENTOR
*Hugo E. Enders*
BY
*Stuart Hilder*
ATTORNEY

Feb. 21, 1933.  H. E. ENDERS  1,898,819
ATTACHMENT FOR CALCULATING MACHINES
Original Filed Aug. 17, 1927  9 Sheets-Sheet 4

INVENTOR
Hugo E. Enders
BY Stuart Hilder
ATTORNEY

Feb. 21, 1933. H. E. ENDERS 1,898,819
ATTACHMENT FOR CALCULATING MACHINES
Original Filed Aug. 17, 1927 9 Sheets-Sheet 6

INVENTOR
BY Hugo E. Enders
Stuart Hilder
ATTORNEY

Feb. 21, 1933. H. E. ENDERS 1,898,819
ATTACHMENT FOR CALCULATING MACHINES
Original Filed Aug. 17, 1927   9 Sheets-Sheet 7

INVENTOR
Hugo E. Enders
BY Stuart Hilder
ATTORNEY

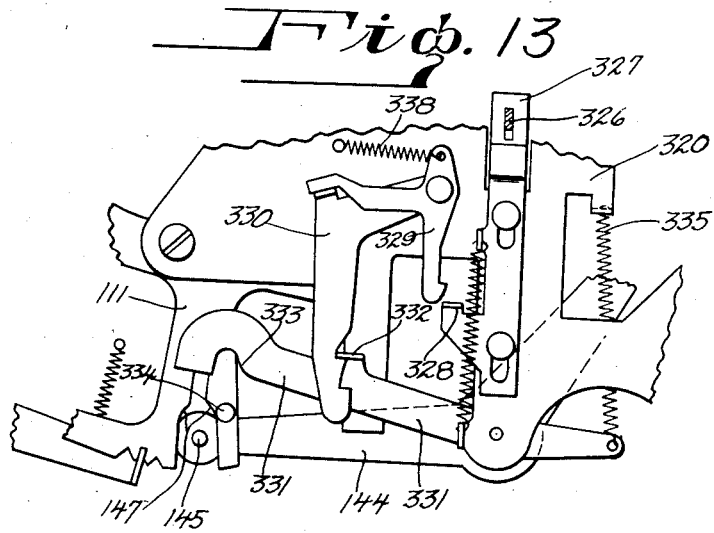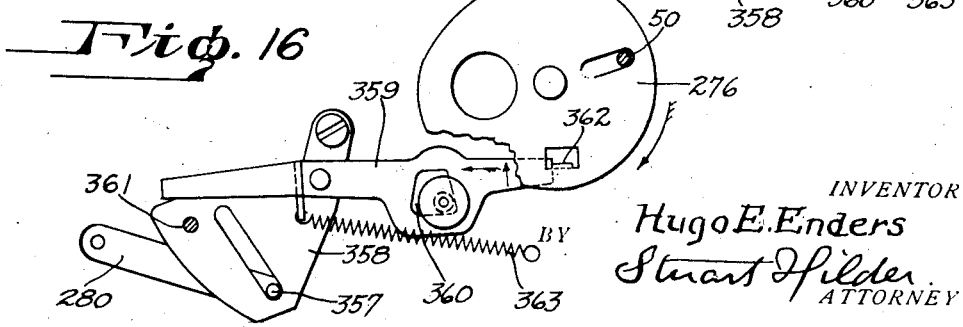

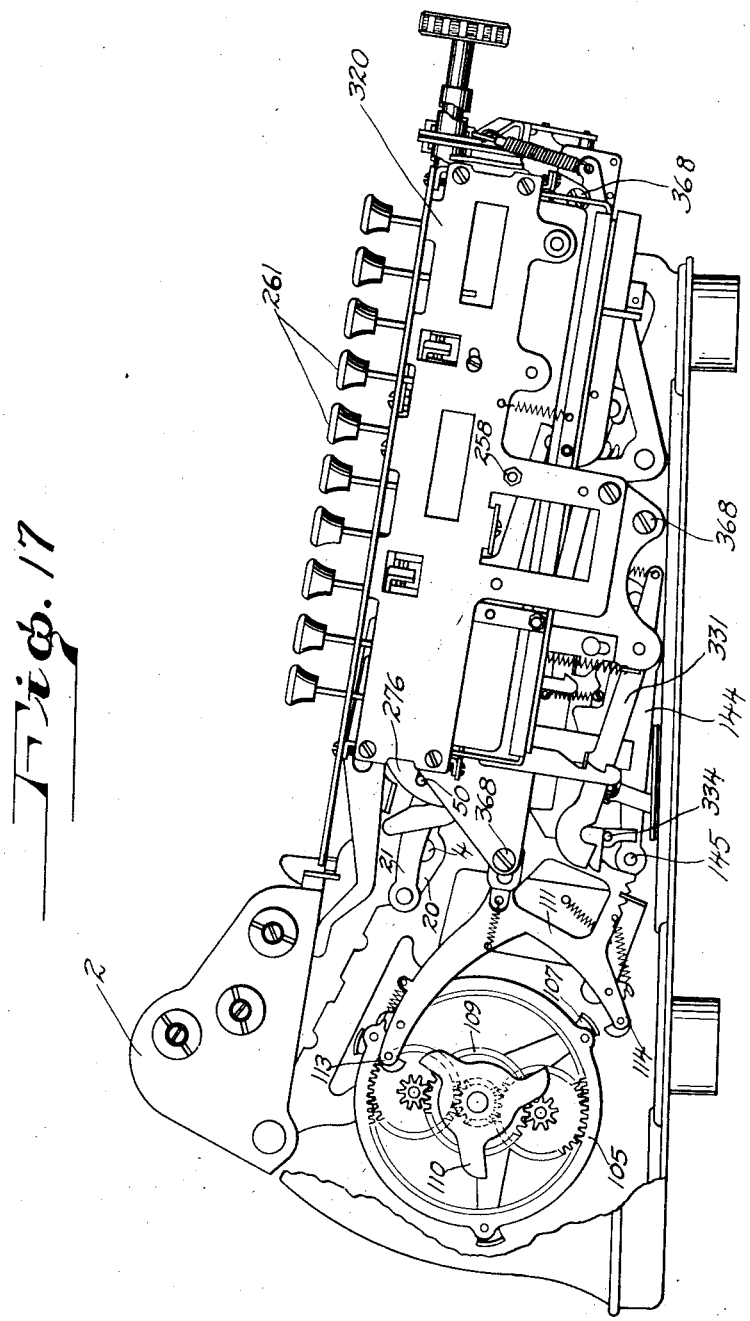

Patented Feb. 21, 1933

1,898,819

UNITED STATES PATENT OFFICE

HUGO E. ENDERS, OF BELLEVILLE, NEW JERSEY, ASSIGNOR TO MONROE CALCULATING MACHINE COMPANY, OF ORANGE, NEW JERSEY, A CORPORATION OF DELAWARE

ATTACHMENT FOR CALCULATING MACHINES

Original application filed August 17, 1927, Serial No. 213,570. Divided and this application filed November 15, 1930. Serial No. 495,916.

The invention relates to calculating machines, and more particularly to an attachment therefor whereby multiplication may be performed and products registered automatically upon the manipulation of devices representing the desired multiplicand and multiplier.

An object of the invention consists in providing such multiplier mechanism as a removable unit.

Another object is to render such a unit attachable to the machine without separately connecting the various cooperating parts.

Other objects and advantages will hereinafter appear.

The invention consists in the novel construction and combinations of parts, as set forth in the appended claims.

Multiplication is commonly performed upon calculating machines by repeated addition of the multiplicand, and such machines are commonly capable of multiplying without special devices, other than means for retaining amounts set up in the selecting mechanism and means for registering products by counting the number of additions made. Machines so equipped are, therefore, complete calculating machines, aside from any provision for making the operation automatic, and it is obviously of advantage to design the automatic mechanism as an attachment which may be provided or not, according to individual requirements.

The present application is a division of application Serial No. 213,570, filed August 17, 1927, entitled Automatic multiplication mechanism for calculators, and issued December 27, 1932 as Patent No. 1,892,614.

The reversible cycle calculating machine to which the invention is shown as applied accords with the disclosure of U. S. Patent No. 1,566,650, issued to Geo. C. Chase, Dec. 22, 1925, as modified by the disclosure of the Chase Patents No. 1,664,661, issued April 3, 1928, and No. 1,685,074, reissued as No. 17,466 on October 22, 1929; and by U. S. application for patent of the same inventor, No. 159,155, filed January 5, 1927.

In the accompanying drawings, illustrating the invention:

Fig. 13 is a left side detail view of the multiplier attachment unit, showing the parts controlling the starting of the machine in normal position.

Fig. 14 is a detail side view, showing the parts effecting release of the multiplier key lock in position assumed upon the depression of a multiplier key, plus or minus bar or upon setting the automatic division lever in operative position.

Fig. 15 is a similar view, with the parts in position assumed during the rebound of the actuating mechanism toward dead center position.

Fig. 16 is a view similar to Fig. 15, showing how the final rebound unlatches the multiplier key.

Fig. 17 is a left side view of the machine with the multiplier unit attached and casing removed.

Registering means Figs. 1-5

Figure 1:
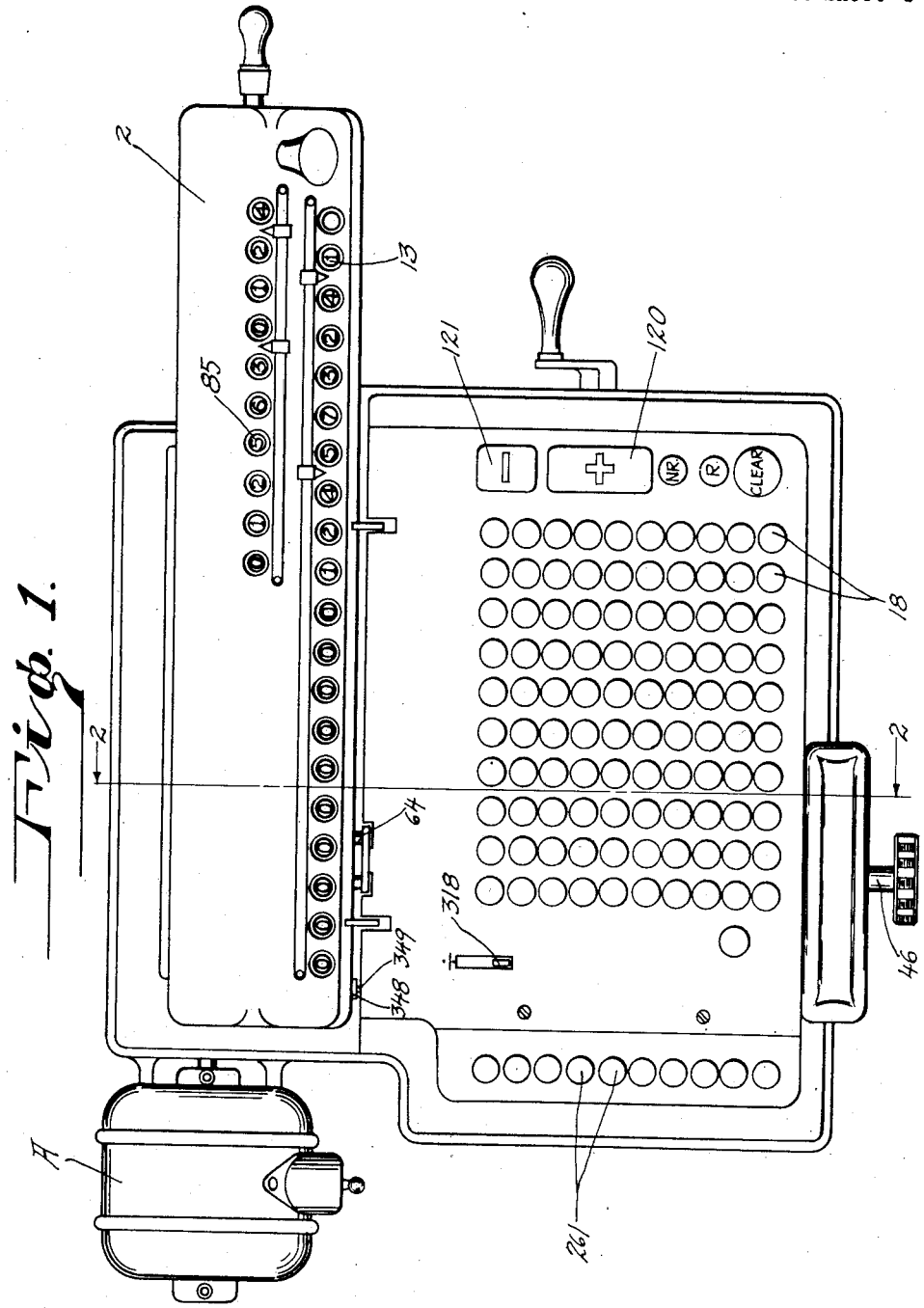
Fig. 1 is a plan view of a machine embodying the invention.
Figure 2:
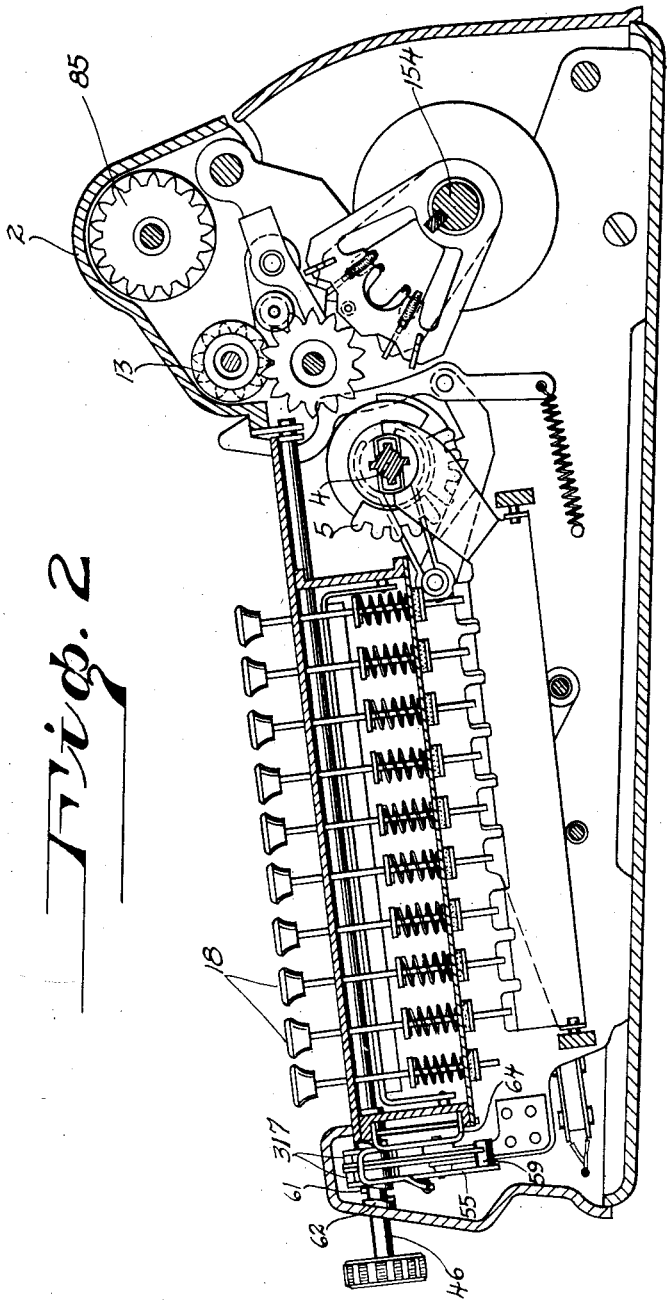
Fig. 2 is a sectional view, taken on line 2—2 of Fig. 1.

According to the present disclosure, and as more fully set forth in the Chase patents above referred to, amounts set up on the keyboard 18 and thereby upon the differential actuating gears 5 (Fig. 2) are registered upon numeral wheels 13 by the operation of differential gear shaft 4 and shaft 154 whereon the tens carry members are mounted, these shafts being connected by suitable gearing.

Multiplier and quotient wheels 85 are provided, as shown in these patents, or in accordance with the well known arrangements. The above-mentioned patents and application also disclose the use of a transversely shiftable carriage 2, whereon the numeral wheels 13 and 85 are mounted, and which is employed in the well known manner in performing operations in multiplication and division.

Figure 3:
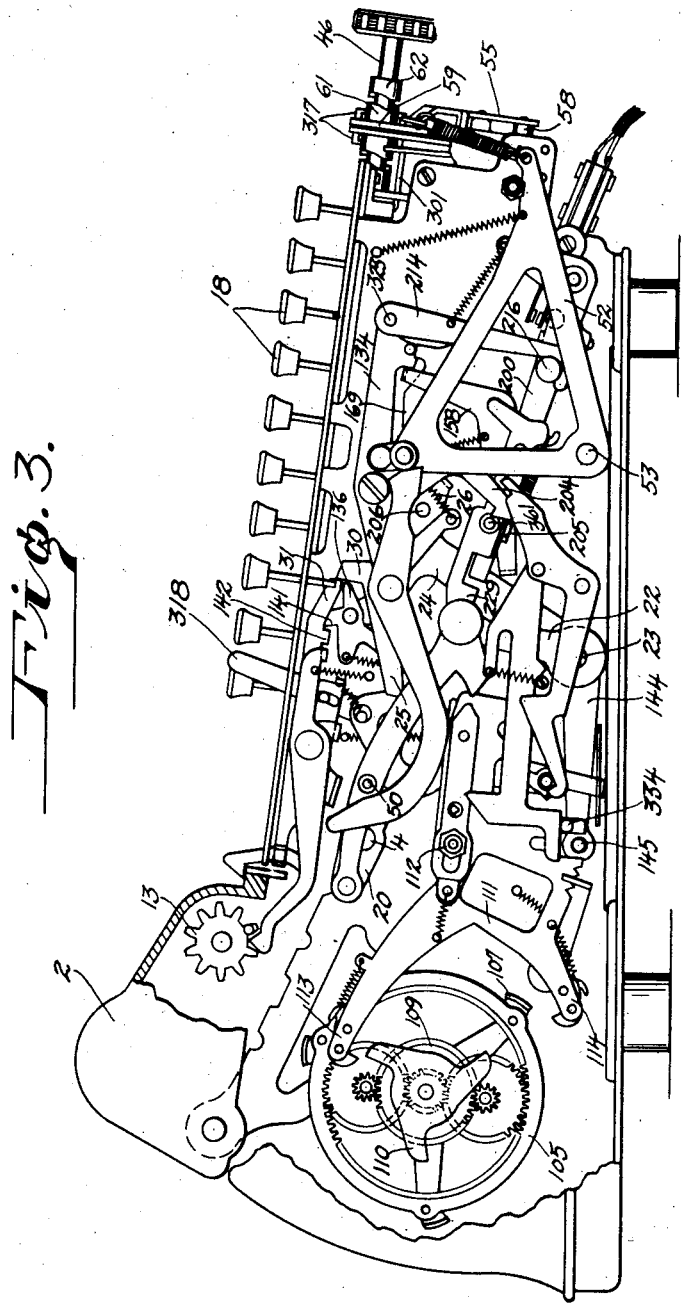
Fig. 3 is a left side view of the machine, with the casing broken away and the multiplier attachment removed.
Figure 4:
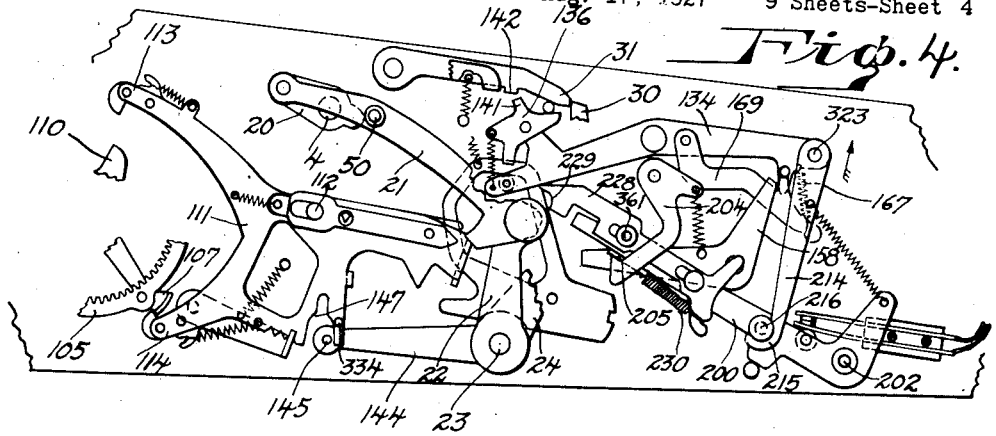
Fig. 4 is a detail left side view of the machine with the stop controlling parts in position taken when the plus bar or a multiplier key is depressed.

The motor driving means illustrated is substantially the same as that disclosed in the Chase patents, wherein a motor A is shown in driving connection with a planetary gear mechanism, the gear members 105 and 109 of which normally rotate idly but may be selectively arrested by means of a reversing clutch lever 111, fulcrumed at 112, to drive the third member of a differential, connected with carry shaft 154, forwardly or reversely. (Figs. 3 and 4.)

Reversing clutch lever 111 is thrown from neutral into additive or subtractive clutch position by means of add key 120, subtract key 121 or division lever handle 318, as fully explained in the hereinbefore mentioned art, and by the multiplier devices forming the subject of the present invention, in the manner described hereinafter. Lever 111 being set for additive rotation, the clutch tooth of arm 114 of said lever will engage with lug 107 of gear 105 to cause additive rotation of the numeral wheel actuators, and said lever being set to subtraction position the clutch tooth of arm 113 thereof is engaged with clutch member 110 of gear 109 to cause subtractive rotation of the numeral wheel actuators.

To stop the movement of the actuators at the end of an operation a crank arm 20 is provided upon shaft 4, said arm having link connection 21 with rock lever 22. Arm 24 is pivoted at 23 and normally held in rearward position by spring 28 (Fig. 5), and carries pivotal stop element 25 located in the plane of and normally held outside the path of movement of rock lever 22, against the tension of the spring 26, by the action of spring 28 and engagement of lug 30 of element 25 with the end of a compound trigger lever 31. As the forward end of lever 31 is raised out of engagement with lug 30, element 25, actuated by its spring will drop into position to engage the free end 27 of the rock lever 22 as the latter begins its next forward stroke. Arm 24 will now move as a unit with rock lever 22, a rearward extension 144 of said arm engaging by means of a pin 145 thereon with one of the opposite cam walls 147 of reversing clutch lever 111, to bring the latter to neutral or unclutched position.

Figure 5:
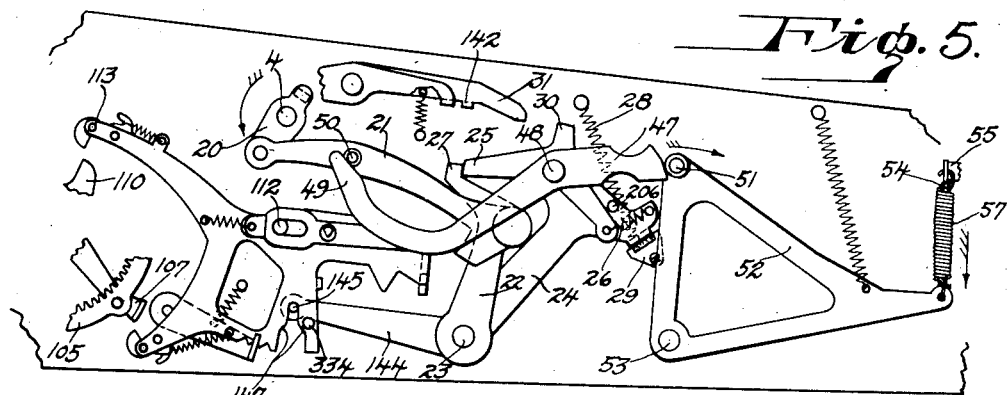
Fig. 5 is a detail left side view of the machine with the multiplier attachment unit removed, showing the parts effecting a carriage shift at the end of an additive extra cyclic movement.

The numeral wheel actuating means, thus freed from the action of the motor, will be brought to rest at full cycle position as follows:

Following the action of arm 24 upon lever 111, continued movement of lever 22 and arm 24 will bring a lug of the latter into engagement with the stop 29 as shown in Figure 5, whereby forward movement of the parts will be arrested beyond the full cycle position, and spring 28 will be tensioned. Spring 28 and the rebound action of the parts will return the actuating mechanism to full cycle position, where the movement will be finally checked and the parts locked in such position as follows:

Lock lever 200 (Fig. 4) is fulcrumed to the framing at 202, and is adapted to engage the forward end of link 21 when crank arm 20 is in rearward dead center position, said position corresponding to the full cycle position of the actuating mechanism. When one of the operation keys is moved to operative position, lock lever 200 is raised out of engagement with link 21 and held in disengaged position by engagement of a spring latch 204 with lug 205 of said lever. As arm 24 is rocked forwardly in the operation of the full cycle stop, a pin 206 of said arm will contact with latch 204 and release the lock lever therefrom, said lever thereupon falling upon link 21 and, thereafter dropping to locking engagement with the end of the link as the parts are returned to full cycle position.

In bringing the actuating means to rest, spring 28 and stop 29 exercise a retarding action, and in order further to cushion the stop spring means are provided whereby a slight yielding of the engaging portion of lever 200 is permitted under the impact of link 21. For this purpose lock lever 200 is provided with a slide extension 228, having an end lug 229 projecting beyond the free end of said lock lever and normally held spaced therefrom by spring 230. Contact of link 21 is made with lug 229 and movement of said link, with the actuating mechanism, is resisted by spring 230 which will also return the slide extension 228 to normal position. The cushioning movement is limited by engagement of lug 229 with the end of lever 200.

Multiplier mechanism Figs. 7–13

According to the present embodiment of the invention product figures are obtained by adding the multiplicand set up on the keyboard a number of times corresponding to the value of the multiplier, and accordingly the multiplier mechanism provides means for operating the starting and stopping devices above described.

Figure 10:
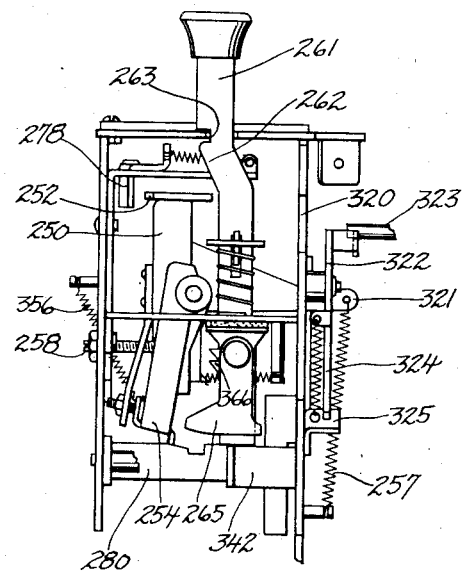
Fig. 10 is a front view of the multiplier attachment, with part of the frame removed, showing the parts in neutral position.
Figure 11:
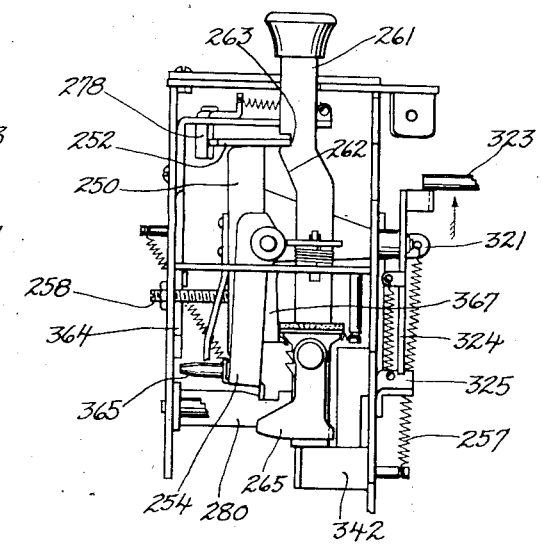
Fig. 11 is a similar view to Fig. 12, with the parts in the position taken when the key is fully depressed.

For this purpose a bail 250 (Figs. 8, 10 and 11) is pivotally mounted upon the multiplier frame 320, and carries a slide 252 secured thereon by a pin and slot connection, the slide being held in rearward position by means of a suitable spring. A spring 257 holds bail 250 normally in position engaging the stop 258. Slide 252 is provided with lateral spaced teeth 259, which in the normal position of the slide underlie cam edges 262 of the multiplier keys 261 (Fig. 10). The upper portion of the cam edge 262 of each key terminates in a notch 263 of less depth than the rise of the cam, and upon depression of the key the cam edge 262 engaging the tooth 259 of slide 252, will rock bail 250 to the left, and will then allow the bail to return partway to the right and will hold it in this position by engagement of tooth 259 with notch 263. (Fig. 11).

Figure 9:
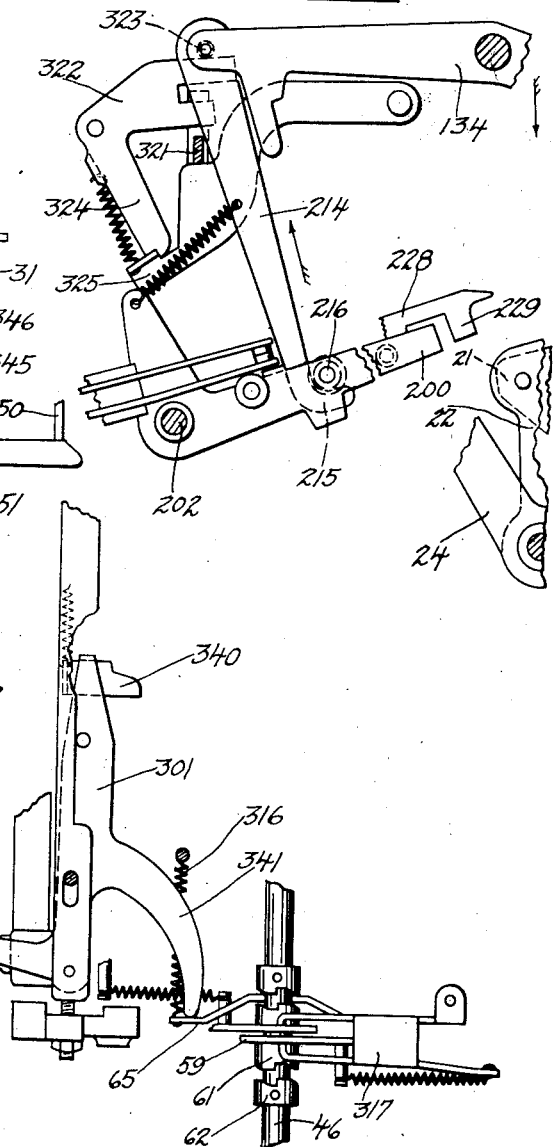
Fig. 9 is a detail side view of parts shown in Fig. 14, controlling the latching of the stopping mechanism.

Bail 250 is provided with an arm 321 underlying lever 322 fulcrumed upon frame 320 (Fig. 9). Upon one arm of lever 322 rests a pin 323, said pin forming a pivotal connection between link 214 and setting lever 134, fulcrumed upon the main frame of the machine. Link 214 is provided with a hook end 215 underlying a stud 216 of the lock lever 200. As bail 250 is rocked to the left, arm 321 will rise, carrying with it lever 322, pin 323, link 214 and lock lever 200, the latter being engaged with latch 204, so that the actuating means will be free to rotate.

The movement imparted to setting lever 134 by the rocking of the bail carries the pawl 136 mounted upon the rear end of said lever downward and allows it to bring lug 141 of the pawl beneath lug 142 of trigger lever 31 (Fig. 4). Setting lever 134 and pawl 136 are held in this position by the engagement of an arm 324 of lever 322 with a spring latch 325 (Fig. 9), so that as the tooth 259 of slide 252 enters the notch 263 of the key and the bail 250 drops partially back, said pawl will remain in fully depressed position. The depression of pawl 136 positions the parts for the tripping of trigger 31 and the operation of the stop at a future time.

An arm 326 (Fig. 13), similar to arm 321, is provided upon bail 250, said arm 326 engaging the slotted end of a slide 327, having pin and slot connection with frame 320. A lug 328 of slide 327 normally underlies the toothed end of a click latch 329 mounted upon one arm of a latch lever 330. A spring tensioned starting lever 331 is normally restrained by engagement of a lug 332 thereof with a tooth of latch lever 330, said starting lever being provided with a cam edge 333 overlying a pin 334 of the reversing clutch lever 111. As bail 250 is rocked to extreme left hand position, arm 326 thereof will raise slide 327, and lug 328 will displace and pass over the tooth of click latch 329. Upon the partial movement of bail 250 toward the right, slide 327 will be carried downward and latch lever 330 will be moved to disengage its above-mentioned tooth from starting lever 331, spring 335 of lever 331 thereupon bringing cam edge 333 against pin 334 and throwing the reversing clutch lever 111 from neutral into adding position.

The machine being thus unlocked and set in motion, rock lever 22 will be brought in contact with the lever 158 (Fig. 4) fulcrumed upon the main frame of the machine, causing the latter lever to depress a pivoted arm 169 of lever 134, and thereby to tension a spring 167 connecting arm 169 and lever 134. The power stored in this spring is utilized to trip trigger lever 31 when lever 134 is released to terminate the operation.

The cycles of operation are counted and the quotient figure registration terminated at the proper time by the following means:

Slide 252 (Fig. 8) is provided with rack teeth 270 and 279 which, as the bail 250 is swung to the right, engage with pawls 269 and 278, said rack teeth pushing the pawls backward slightly and remaining in engagement therewith after the tooth 259 falls into the notch 263 of the key. Pawl 269 is mounted upon a rocker 273, provided with a roller 275, engaging the edge of a cam disc 276 (Fig. 11) and held thereagainst by spring 277, the rocker being pivoted upon the framing 320. Cam disc 276 is provided with a radial slot engaging a pin 50 (Fig. 4) mounted on the link 21 of the stopping mechanism, so that disc 276 will receive one complete rotation for each rotation of the actuating mechanism of the machine. During each such rotation the rise 337 of cam disc 276 will move the rocker 273 and cause pawl 269 to advance slide 252 a distance corresponding to one rack tooth, said slide being held in the advanced position by means of the pawl 278 and rack teeth 279. The teeth 259 of slide 252 vary in breadth, the tooth cooperating with the 1 key being adapted to be moved out of register with the key upon forward movement of slide 252 one step; the tooth cooperating with the 2 key normally extending rearwardly of the key stem a sufficient distance to register therewith until slide 252 has been moved forwardly two steps, etc., progressively, so that the tooth cooperating with the 9 key provides for registration until the slide has been moved nine steps. Upon release from the key, bail 250 with slide 252 returns to normal position, releasing the pawls 269 and 278 and allowing the slide 252 to return to its normal rearward position under the action of its spring as soon as the upward movement of the key allows the teeth 259 to pass below cam edge 262.

The return movement of the released bail brings arm 321 thereof against the spring latch 325 (Fig. 9), releasing the lever 322 and permitting lug 141 of pawl 136 to be brought against lug 142 to trip the trigger lever. Thus the unclutching and stopping devices previously described are brought into action upon the completion of the cycle. As pin 145 (Fig. 13) is carried upward to bring reversing clutch lever 111 into neutral position it will contact with the end of starting lever 331, and will raise said lever into engagement with latch lever 330, the restoration of bail 250 having previously depressed slide 327 and caused click latch 329 to slip from lug 328, and latch lever 330 having thereupon been returned to latching position by its spring 338.

*Carriage shifting Figs. 5, 6, 8 and 12*

The machine is put in condition for automatically shifting the numeral wheel carriage 2 to the right upon the completion of a multiplier figure registration by the engagement of the clutch hub 61 of a carriage shifting cam 59 with a clutch member 62 fast upon carriage shifting shaft 46, this engagement being effected upon depression of the multiplier key by the following means:

The lever 339 (Fig. 8), fulcrumed upon frame 320, has an arm engaging bail 250 and a laterally projecting arm engaging a laterally projecting arm of lever 301 fulcrumed within the main frame of the machine. A rearward extending arm of lever 301 engages a spring latch 340 and is provided with a spur 341 contacting with a plate 65 pivoted to the main frame of the machine, said plate having a shipper arm 317 engaging clutch hub 61.

Figure 6:
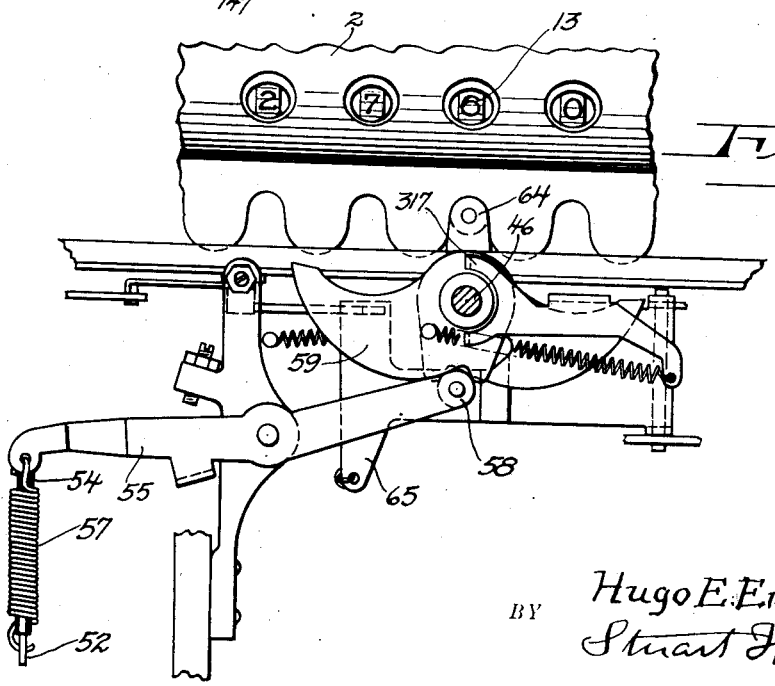
Fig. 6 is a similar view to Fig. 25, with the carriage shifting cam rotated 90° and the carriage advanced one-half step toward the right.

As bail 250 is rocked upon the depression of a key, lever 339 will rock lever 301 and plate 65 will bring clutch hub 61 into engagement with clutch member 62 against the tension of spring 316. The clutch will be latched in engaging position by spring latch 340, so that an operation of the full cycle stopping means will serve to shift the numeral wheel carriage as follows:

Push rod 47 (Fig. 5) is pivoted on arm 24 at 48, and has a rear cam face 49 engaging pin 50 mounted upon link 21, the forward end of said push rod being adapted to push forwardly against roller 51 mounted on a bell lever 52. Lever 52 is fulcrumed at 53 to the framing of the machine and is connected at its forward end with an arm of carriage shifting lever 55 by means of spring 57, and spacer rod 54. The other or right hand arm of carriage shifting lever 55 is provided at its free end with a roller 58 adapted to operate carriage shifting cam 59 (Fig. 6).

During the movement of arm 24 of the stop mechanism from normal position to position of contact with stop 29, at the end of the product figure registration, pin 50 of link 21 encounters cam end 49 of the push rod and thereby pulls the forward end of said rod against roller 51 of the bell lever 52, the push rod 47 moving jointly with arm 24 and operating bell lever 52 to tension spring 57. Spring 57 being elongated stores energy and utilizes the same more slowly in its operation of the carriage shifting lever 55. As roller 58 of the carriage shifting lever is carried upward, cam 59 and shaft 46 are rotated clockwise as viewed in Figure 6, and one of the opposite crank pins 64 of said shaft engaging a serration of the rack located on the forward edge of the carriage, the carriage will be raised and advanced about one half of its step movement. The momentum of the carriage and the force of gravity acting thereon is sufficient to complete the shifting into the next ordinal position.

The above described movement of arm 24 will also carry said arm forwardly against latch 340 and will thereby release lever 301 (Fig. 12), whereupon plate 65 will be free to disengage the clutch members 61 and 62, under the influence of spring 316.

Figure 7:
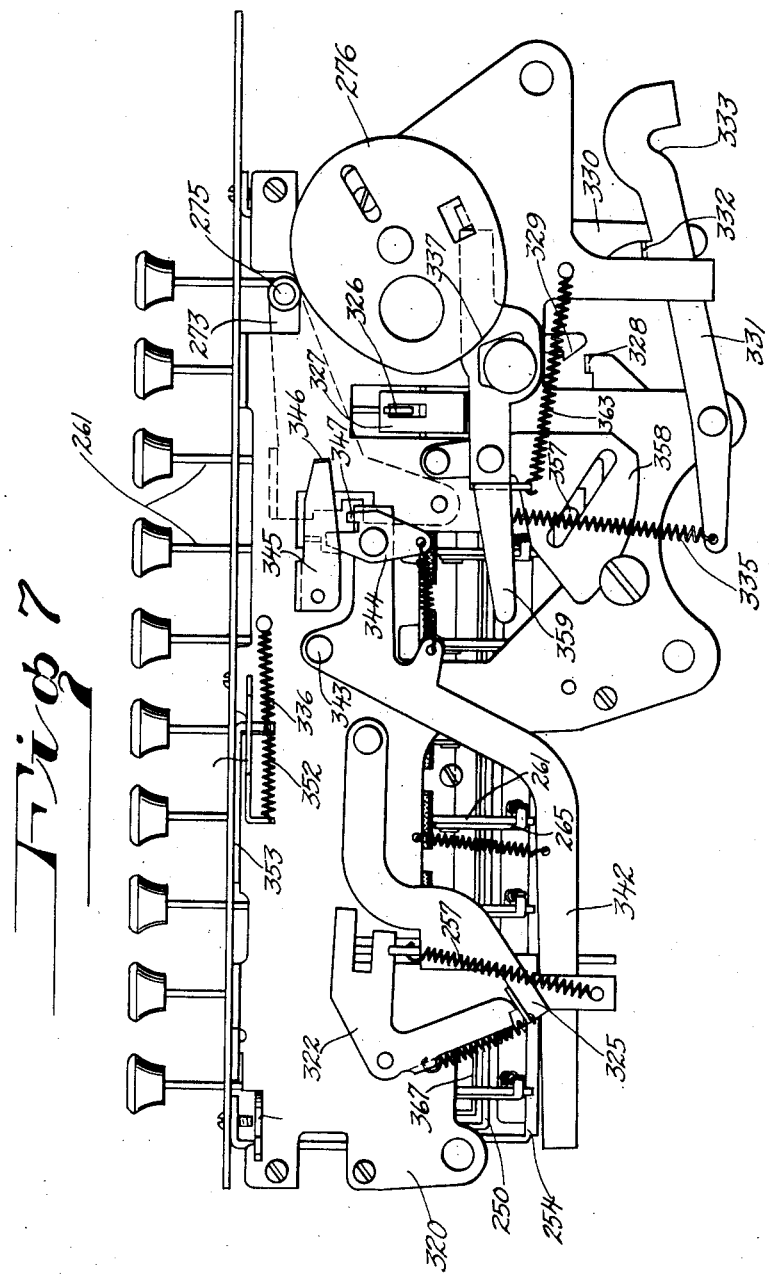
Fig. 7 is a right side view of the multiplier attachment unit.
Figure 8:
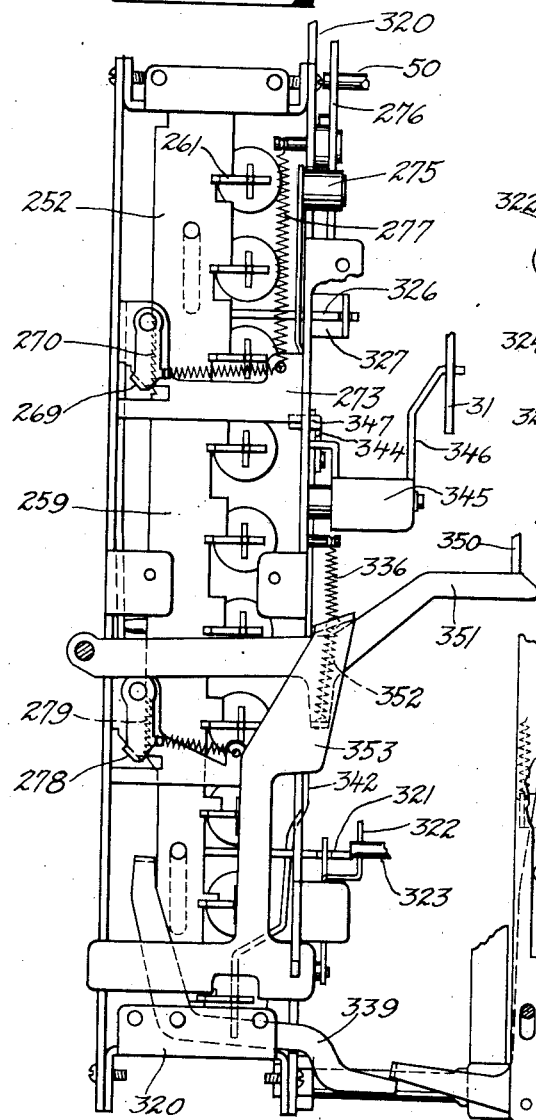
Fig. 8 is a plan view of the multiplier attachment unit and associated parts with key buttons and top plate removed.
Figure 12:
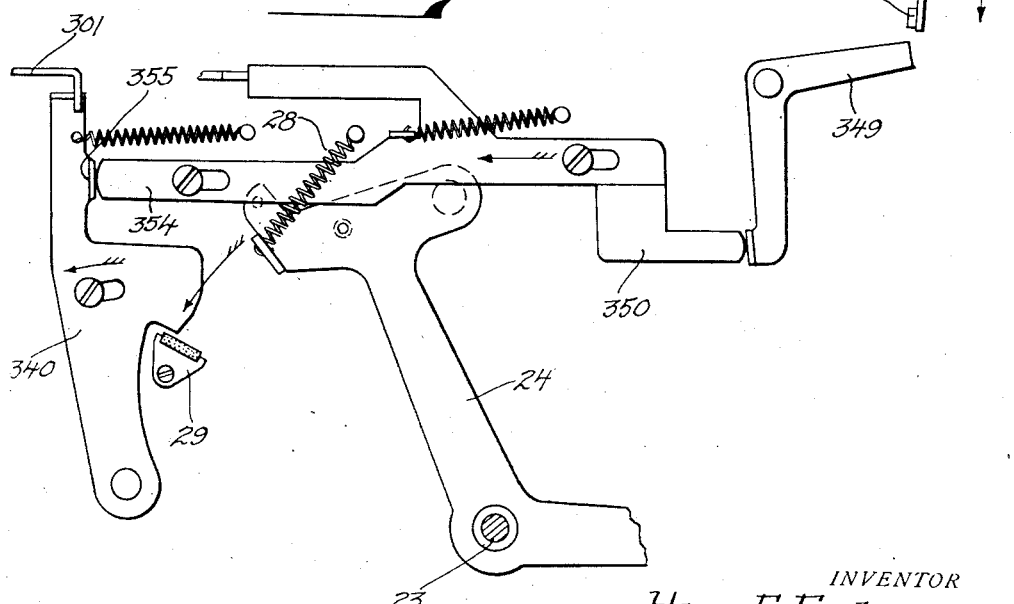
Fig. 12 is a detail side view, showing the parts which effect the release of the carriage shift clutch and which effect the locking of the 0-key when the carriage is in extreme right hand position.

*0 multiplier or carriage shift key—Figs. 7, 8 and 12*

It has been shown that the operation of the full cycle stop at the end of a product figure registration will serve to shift the carriage, throw the reversing clutch lever 111 to neutral position and return the actuators from the limit of the full cycle zone and bring them to rest in full cycle position. It will also be noted that if the stop member 25 be tripped when the parts are in their normal position of rest the full cycle stop will operate without allowing the actuators to pass out of the idle zone. That is to say, extracyclic operation of the stopping means, instead of following the final cycle of operation, will occur independently of any cyclic movement of the actuators. Obviously, under these conditions, shifting of the carriage, without registration, will take place.

The 0 multiplier key is therefore arranged to rock bail 250 and thereby to operate the different multiplier devices precisely as they are operated by the other multiplier keys, and in addition to this, means are provided whereby the depression of the 0 multiplier key will immediately trip trigger 31 to release the stop member 25.

This tripping means comprises a lever 342 (Fig. 7) fulcrumed intermediately of its length at 343 in the frame 320, the forward end of said lever lying under the stem of the 0 key and the rearward end thereof being provided with a latching pawl 344. Pawl 344 underlies a lever 345 fulcrumed in frame 320 and provided with an arm 346 engaging the lower edge of trigger lever 31. Upon depression of the 0 key lever 342 will be rocked and pawl 344 will act to raise lever 345 and trigger lever 31, the parts being held in this position by the key locking means hereinafter described until the rocker 273 of the slide operating pawl 269 is moved by the cam disc 276, whereupon rocker 273 will contact with the lug 347 of pawl 344 and move said pawl out of latching engagement with lever 345, whereupon trigger lever 31 will be allowed to drop under the influence of its spring. This latching of trigger lever 31 in tripped position will insure that element 25 is given sufficient time to move into engagement with arm 24 before lever 31 is released.

Means are provided whereby the 0 key will be locked in inoperative position when the numeral wheel carriage rests in extreme right hand position. For this purpose a lug 348 on the forward edge of the carriage (Fig. 12) engages the rear arm of the bell lever 349 as said carriage drops to its extreme right hand position, a depending arm of said bell lever being thereby operated to push slide 350 forwardly. The forward end of slide 350 engages a lever 351 (Fig. 8) fulcrumed in the frame 320, said lever being connected by means of a spring 352 with a slide plate 353 adapted to move into engagement with the notch 263 of the 0 key. If the 0 key is in raised position when the carriage enters extreme right hand position the movement of slide 350 and lever 351 will bring slide plate 363 into register with the key and lock the same in inoperative position, whereas if the 0 key is held depressed at this time, spring 352 will be put under tension and will serve upon release of the key to engage slide plate 353 with notch 263. The slide plate 353 will be returned to normal position when the carriage is shifted out of extreme right hand position by means of a spring 336, weaker than spring 352.

As the carriage enters extreme right hand position, latch 340 holding the carriage shifting clutch 61, 62 in engagement, will be released, by means of an arm 354 of slide 350 engaging the lug 355 of latch 340, so that no shifting impulse will be transmitted when the carriage is in extreme shifted position (Fig. 12).

*Multiplier key locking means Figs. 10 and 11*

It will be obvious from the foregoing description that the engagement of the teeth of slide 252 with notch 263 of the key stem not only acts to lock the bail 250 in operative position but also serves to lock the multipier keys in depressed position until the step by step movement of the slide has disengaged the teeth from the key notch. In order that the zero key may act to hold trigger lever 31 in tripped position as above set forth, whether finger pressure is retained on the key or not, the zero key stem is made the same as the stem of the other keys and the slide 252 is provided with a tooth 259 cooperating with the zero key and being of the same longitudinal extent as the tooth cooperating with the 1 key. It follows that the zero key, not only operating the parts of the multiplier mechanism as do the other multiplier keys, but also being locked down in the same manner, the cam disc 276 which gives the step by step impulse to the slide 252 must lift the roller 275 during the first quarter rotation of the actuating means in additive direction, since this quarter rotation forms the entire movement of the parts in carriage shifting operations governed by the 0 key.

Means are provided whereby the depression of one of the multiplier keys 261 or the 0 key will lock the undepressed keys in raised position until the completion of the initiated operation, for which purpose each of said keys is provided with a spring pawl 265 (Fig. 10) mounted upon the end of the stem, and a locking bail 254 is pivoted upon the bail 250 and adapted when bail 250 is rocked to active position to take position above the pawl 265 of the depressed key and beneath the pawls of the undepressed keys. When the depressed key is released from the teeth of slide 252 it will be restored to raised position by its spring, pawl 265 camming over locking bail 254 and coming to position above said bail, when the key in question as well as all of the other multiplier keys will remain in locked position until the end of the operation. This is due to the provision of a latch 280 engaging locking bail 254 (Fig. 11) and retaining it in locking position after the return of bail 250 to normal. At the end of the product figure operation latch 280 will be released and locking bail 254 allowed to return to normal position under the influence of spring 356, by the following means: Latch 280 is provided with a pin 357 (Figs. 14–16) engaging a slot formed in a lever 358 fulcrumed upon frame 320. An arm 359 is pivoted intermediately of its length upon lever 358 and has a slot 360 having guiding engagement with a pin of frame 320. Upon depression of a multiplier key, the movement of latch 280 and pin 357 will allow spring 363 to pull arm 359 rearwardly. The forward end of arm 359 overlies a pin 361 in locking lever 200 and the rearward end of the arm is movable into and out of the path of a lug 362 of cam disc 276 in the manner now to be described.

When the machine is in action and locking lever 200 latched in raised position pin 361 will hold arm 359 out of the path of movement of lug 362 (Fig. 14). When the machine is brought to rest at the end of an operation, locking lever 200 will fall, and pin 361 will allow the rear end of arm 359 to be moved upward against lug 362, under the influence of spring 363. The actuating means will now be returned to full cycle position, in which return movement lug 362, rotating with cam 276 will clear the rear end of arm 359, which will rise behind said lug (Fig. 15). Further vibration of the parts will bring lug 362 in contact with the rear end of arm 359 and will move said arm and lever 358 forwardly, the slot of the lever through engagement with pin 357 serving to move latch 280 out of engagement with locking bail 254, whereupon said lock will be retracted and the multiplier keys released (Fig. 16).

Means are also provided whereby the multiplier keys will be locked in raised position upon operation of the machine by any other devices, such as the add, subtract or divide keys, this means comprising an arm 364 (Fig. 11) of the rocker 273 and cam pin 365 of locking bail 254. During the first quarter rotation of the machine in additive direction, or the fourth quarter rotation in subtractive direction rocker 273 will be actuated by cam disc 276 and locking bail 254 moved by arm 364 and cam pin 365 into position beneath pawls 265 of the multiplier keys, where said bail will be held by latch 280. The release of the locking bail will occur at the end of the additive, subtractive or divisional operation in the same manner as in multiplication.

In order that a multiplier key may not be operated by a partial stroke and returned to raised position after having adjusted certain but not all of the multiplier devices, the stems of the keys 261 and of the zero key are provided with teeth 366 (Figs. 10, 11) and a ratchet bail 367 is mounted upon bail 250. As bail 250 is rocked in the depression of a key, ratchet bail 367 will be swung into the path of the teeth 366 and will thereafter fall successively behind said teeth to retain the key in partially depressed position. When, however, slide tooth 259 falls into key notch 263, ratchet bail 367 will be moved out of the path of teeth 366, so that when the key is released from slide 252 it may be restored to raised position.

*Removable multiplier unit, Figs. 7 and 17*

It will be noted that those portions of the mechanism supported by frame 320 which act directly upon or are acted directly upon by members supported upon the main frame of the machine are designed to be brought into cooperating relation with said members by a bodily movement of frame 320.

In connecting the unit to the machine all of the mechanism of both parts are placed in normal position. As regards the multiplier unit this implies a positioning of cam disc 276 with the rise thereof directed to the rear; starting lever 331 latched in the top notch of latch lever 330, and lug 362 of the cam disc resting in rear of arm 359, whereby the forward portion of said arm will lie in position to slip over pin 361 when frame 320 is moved horizontally toward the main frame of the machine. By this same movement pin 50 will enter the slot of cam disc 276; the free end of lever 345 will slip under trigger lever 31, and starting lever 331 becomes positioned above pin 334 of the reversing clutch lever 111. As the parts are brought into engagement it is also observed that lever 339 is positioned with its laterally extending arm in a forward position and lever 301 upon the main frame of the machine is pushed back so that lever 339 will lie in front of the same. Lever 322 is also engaged beneath pin 323 and lever 351 is brought in front of slide 350 by the same movement of the parts.

Frame 320 being brought to position, suitable securing screws 368 serve to fasten it upon the machine.

It will be noted that the multiplier unit lies out of the vertical plane of the other mechanism of the machine, so that when it is removed a different casing may be used which will fit snugly about the machine without leaving a vacant space as a result of such removal.

I claim:—

1. A multiplier attachment unit for a calculating machine having a transversely shiftable carriage, numeral wheels thereon, a main frame, selecting mechanism thereon, means for registering upon said numeral wheels amounts set up in said selecting mechanism, and carriage shifting devices, said unit comprising a supplemental frame, means mounted thereon including a cyclically advanced multiplier control device and keys for automatically determining a product, and cooperating means mounted upon said supplemental frame for determining automatic shifting of said carriage, said unit being attachable to and detachable as a whole from said machine.

2. A multiplier attachment unit for a calculating machine having a transversely shiftable carriage, numeral wheels thereon, a main frame, selecting mechanism thereon, means for registering upon said numeral wheels amounts set up in said selecting mechanism, and carriage shifting devices, said unit comprising a supplemental frame, means mounted thereon including a cyclically advanced multiplier control device and keys for automatically determining a product, and cooperating means mounted upon said supplemental frame for determining automatitc shifting of said carriage, said unit lying out of the vertical plane of the main frame.

3. A multiplier attachment unit for a calculating machine having a transversely shiftable carriage, numeral wheels thereon, a main frame, selecting mechanism thereon, means for registering upon said numeral wheels amounts set up in said selecting mechanism, and carriage shifting devices said unit comprising a supplemental frame, means including a cyclically advanced multiplier control device and keys mounted thereon, and cooperating means mounted for determining automatic shifting of said carriage upon said supplemental frame, all parts of the multiplier unit being brought into cooperative relation with the registering means and numeral wheel carriage by movement of said unit to attached position.

4. A multiplier attachment unit for a calculating machine having a main frame, numeral wheels, actuating mechanism therefor, a motor, and clutch means between said motor and said actuating mechanism, said unit comprising a supplemental frame, a cyclically advanced multiplier control device mounted thereon, cooperating with said clutch means, motor keys mounted upon said supplemental frame, selectively depressible to determine the number of cycles of operation of said actuating mechanism, and means for locking the multiplier keys upon movement of said actuating mechanism, all parts of the multiplier unit being brought into cooperative relation with the actuating and clutch means by movement of said unit to attached position.

5. A multiplier attachment unit for a calculating machine having a main frame, numeral wheels, actuating mechanism therefor, a motor, and clutch means between said motor and said actuating mechanism, said unit comprising a supplemental frame, a cyclically advanced multiplier control device mounted thereon, cooperating with said clutch means, motor keys mounted upon said supplemental frame, selectively depressible to determine the number of cycles of operation of said actuating mechanism, and means for locking the multiplier keys and holding them locked during any movement of said actuating mechanism, all parts of the multiplier unit being brought into cooperative relation with the actuating and clutch means by movement of said unit to attached position.

6. A multiplier attachment unit for a calculating machine having a main frame, numeral wheels, actuating mechanism therefor, a motor, clutch means between said motor and said actuating mechanism, and a clutch controlling key, said unit comprising a supplemental frame, a cyclically advanced multiplier control device mounted thereon, cooperating with said clutch means, motor keys mounted upon said supplemental frame, selectively depressible to determine the number of cycles of operation of said actuating mechanism, and means for locking the multiplier keys when said clutch controlling key is depressed, all parts of the multiplier unit being brought into cooperative relation with the actuating and clutch and controlling means by movement of said unit to attached position.

7. A multiplier attachment unit for a calculating machine having a transversely shiftable carriage, numeral wheels thereon, actuating mechanism for said wheels, a motor, clutch means between said motor and said actuating mechanism, and carriage shifting devices, said unit comprising a supplemental frame, a cyclically advanced multiplier control device mounted thereon, cooperating with said clutch means and said carriage shifting devices, motor keys mounted upon said frame, selectively depressible to determine the number of cycles of operation of said actuating mechanism, and means for locking the multiplier keys upon movement of said actuating mechanism, said unit being attachable to and detachable as a whole from said machine.

8. A multiplier attachment unit for a calculating machine having a transversely shiftable carriage, numeral wheels thereon, a main frame, selecting mechanism thereon, means for registering upon said numeral wheels amounts set up in said selecting mechanism, and carriage shifting devices, said unit comprising a supplemental frame, means mounted thereon including a cyclically advanced multiplier device and keys for automatically determining a product, and means mounted thereon for determining a multiplication by ten by automatic shifting of said carriage without registration on the wheels, said unit being attachable to and detachable as a whole from said machine.

Signed at Orange in the county of Essex and State of New Jersey this 12th day of November, A. D. 1930.

HUGO E. ENDERS.